United States Patent
Okada (10) Patent No.: US 6,800,397 B2
(45) Date of Patent: Oct. 5, 2004

(54) NON-AQUEOUS ELECTROLYTE SECONDARY BATTERY AND PROCESS FOR THE PREPARATION THEREOF

(75) Inventor: Mikio Okada, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 257 days.

(21) Appl. No.: 09/899,208

(22) Filed: Jul. 6, 2001

(65) Prior Publication Data

US 2002/0018935 A1 Feb. 14, 2002

(30) Foreign Application Priority Data

Jul. 6, 2000 (JP) .................................. P. 2000-205502
Dec. 8, 2000 (JP) ...................................... 2000-373857

(51) Int. Cl.⁷ .............................................. H01M 4/48
(52) U.S. Cl. .............................. 429/231.95; 429/231.1; 429/223; 429/224; 429/304; 29/623.1; 29/623.5
(58) Field of Search .......................... 429/231.95, 231.1, 429/223, 304, 224; 29/623.1, 623.5

(56) References Cited

U.S. PATENT DOCUMENTS

| | | | | |
|---|---|---|---|---|
| 5,952,126 A | * | 9/1999 | Lee et al. ................... | 429/314 |
| 5,976,489 A | * | 11/1999 | Saidi et al. ................ | 429/224 |
| 6,071,489 A | * | 6/2000 | Sun et al. ................... | 429/224 |
| 6,322,929 B1 | * | 11/2001 | Takada et al. .............. | 429/314 |
| 6,451,482 B1 | * | 9/2002 | Watanabe et al. ........ | 429/231.1 |

FOREIGN PATENT DOCUMENTS

| JP | 9-306475 A | 11/1997 |
|---|---|---|
| JP | 10-149828 A | 6/1998 |
| JP | 10-208730 | * 8/1998 |
| JP | 3030995 B2 | 2/2000 |
| WO | WO 97/24773 A1 | 7/1997 |

OTHER PUBLICATIONS

D. Peramunage et al., Preparation and Electrochemical Characterization of Overlithiated Spinel $LiMn_2O_4$, J. Electrochem. Soc., vol. 145, (1998), pp. 1131–1136.

* cited by examiner

*Primary Examiner*—Laura Weiner
(74) *Attorney, Agent, or Firm*—Sughrue Mion, PLLC (57) ABSTRACT

In accordance with the non-aqueous electrolyte secondary battery of the invention and the process for the preparation thereof, charging is carried out with a combination of a positive electrode provided with excess lithium and a negative electrode in order to cause lithium to be deposited on the negative electrode. Accordingly, no oxidized surface film is interposed between lithium and the current collector of negative electrode or the negative active material layer as in the case where a metallic lithium foil is laminated on the negative electrode. In this arrangement, a battery having a small internal resistance can be provided. Since the deposition of lithium is conducted in the assembled battery, lithium does not come in contact with air, preventing the formation of a thick ununiform oxidized film on the surface thereof. Thus, the deposition of dendrite can be inhibited, making it possible to inhibit the drop of battery capacity and hence provide a battery having an excellent cycle life performance. Further, lithium can be retained on the negative electrode in an amount excess to the capacity of the positive electrode. Accordingly, even when lithium is lost due to the deposition of dendrite or the reaction with the electrolyte solution, the drop of battery capacity can be inhibited because the negative electrode is provided with excess lithium.

14 Claims, 6 Drawing Sheets

NON-AQUEOUS ELECTROLYTE SECONDARY BATTERY AND PROCESS FOR THE PREPARATION THEREOF

FIELD OF THE INVENTION

The present invention relates to a non-aqueous electrolyte secondary battery and a process for the preparation thereof.

BACKGROUND OF THE INVENTION

A battery which undergoes reversible reaction involving the absorption of lithium ion released from a positive electrode or a negative electrode by the other to perform charge and discharge has a high voltage and a high energy density and thus has heretofore been widely used as a power supply for consumers' electronic devices. This type of a battery requires an electrolyte solution which cannot decompose within a wide potential range. Thus, a non-aqueous electrolyte solution has been used as such an electrolyte solution, and this type of a battery is referred to as "non-aqueous electrolyte secondary battery" (hereinafter also referred to as "battery" simply).

In particular, the lithium battery comprising a metallic lithium negative electrode which can provide a voltage as high as 3 V or more has been widely studied as a secondary battery which can achieve a high energy density. The metallic lithium negative electrode can be prepared, e.g., by pressure-bonding a metallic lithium foil onto both sides of a current collector of negative electrode made of copper foil or the like.

However, when repeatedly charged, such a battery can be subject to deposition of dendrite of metallic lithium on the surface of the negative electrode, causing shortcircuiting between the positive electrode and the negative electrode. Further, during discharge, dendrite is isolated from the negative electrode, occasionally causing the production of particles of electrochemically inert lithium. As a result, the charge and discharge efficiency is lowered, making it impossible to obtain a sufficient cycle life perforce.

The foregoing phenomenon is presumably attributed to the following mechanism. Metallic lithium can be oxidized very easily and thus can easily react with oxygen in the atmosphere during the preparation of the negative electrode to form an oxidized film on the surface thereof. Since this oxidized surface film has uneven in thickness, current is accumulated onto thin film area during charge and discharge, so that dendrite deposition is liable to occur.

In an attempt to enhance the charge and discharge efficiency for the purpose of solving these problems, hydrogen fluoride, $(C_2H_5)_4NF(HF)_4$ or the like has been used as an additive for electrolyte solution to cause metallic lithium to be deposited in spherical form instead of dendrite ("J. Electrochem. Soc.", 146 (1999) page 1693, "J. Fluorine Chem." 87 (1998) page 235, "Preprint of 40th Seminary on Battery", 1999, page 467). However, this attempt also cannot provide a sufficient cycle life performance. It is considered that the film on spherical metallic lithium particles deposited upon charge undergoes exfoliation due to change in the shape of metallic lithium during discharge, causing metallic lithium to be consumed for the formation of new film.

This type of a battery has another disadvantage. Since the oxidized surface film of lithium is inferior to metallic lithium in electronic conduction and adhesion, a sufficient electrical conduction cannot be attained, providing the battery with a raised internal resistance, even if a metallic lithium foil having an oxidized surface film formed thereof is pressure-bonded onto the current collector of negative electrode.

On the other hand, a so-called lithium ion battery comprising graphite or carbon instead of metallic lithium as a negative electrode and lithium cobalt oxide or lithium nickel oxide as a positive electrode has been conceived and has been used as a high energy density battery. Referring to this lithium ion battery, it is reported that the selection of a proper non-aqueous solvent makes it possible to cause reaction of the electrolyte solution with the carbon negative active material during initial charge, resulting in the formation of a film that acts as a protective film which inhibits further progress of the reaction. However, since lithium which has been consumed for the formation of the film cannot take part in charge and discharge, the negative electrode has a so-called irreversible capacity. It is thus reported that when the battery is overdischarged, the negative electrode loses its residual capacity before the positive electrode, causing the potential of the negative electrode to move to a drastically noble potential and hence causing the change of crystalline structure of the carbon negative electrode, which gives adverse effects on the subsequent battery performance.

In order to solve these problems, it has been proposed to laminate a metallic lithium foil on a positive electrode provided with a positive active material (Japanese Patent No. 3,030,995). In this report, in an attempt to inhibit the drastic rise in the negative electrode potential, the electricity to be supplemented upon initial charge by lithium laminated on the positive electrode is predetermined to be greater than the irreversible capacity of the carbon negative electrode so that the residual capacity of the positive electrode is lost before the negative electrode when the battery is overdischarged.

As another proposal, the use of $Li_{1+x}NiO_2$ (0<x≦1) or $Li_{1+y}Mn_2O_4$ (0<y≦1), which is obtained by adding excess lithium to $LiNiO_2$ or $LiMn_2O_4$, makes it possible to make up for the irreversible capacity of the negative electrode and hence enhance the capacity of the battery (JP-A-9-306475 (The term "JP-A" as used herein means an "unexamined published Japanese patent application"), JP-A-10-149828, JP-A-10-208730, WO9724773A1, J. Electrochem. Soc., Vol. 145, 1998, page 1131).

However, these lithium ion batteries are prepared by a process which comprises absorbing lithium ion by a carbon-based material as a negative electrode, they are inferior to batteries using a metallic lithium negative electrode with respect to energy density.

As another method for solving the problem of battery capacity drop due to irreversible capacity to enhance the energy density of battery there has been proposed a method which comprises laminating a metallic lithium foil on the negative active material. However, this method is also disadvantageous in that the resulting battery has a lower energy density than those using a metallic lithium negative electrode.

SUMMARY OF THE INVENTION

It is therefore an object of the invention to provide a non-aqueous electrolyte secondary battery which exhibits a reduced capacity drop, a reduced internal resistance of negative electrode and an excellent cycle life performance and to provide a process for the preparation thereof.

In accordance with the non-aqueous electrolyte secondary battery of the invention and the process for the preparation thereof, charging is carried out with a combination of a positive electrode provided with excess lithium and a negative electrode in order to cause lithium to be deposited on the negative electrode. Accordingly, no oxidized surface film is interposed between lithium and the current collector of negative electrode or the negative active material layer which is different from the case where a metallic lithium foil is laminated on the negative electrode. In this arrangement, a battery having a low internal resistance can be provided. Since the deposition of lithium is carried out in the assembled battery, lithium does not come in contact with air, preventing the formation of a thick uneven oxidized film on the surface thereof. Thus, the deposition of dendrite can be inhibited, making it possible to inhibit the drop of battery capacity and hence provide a battery having an excellent cycle life performance. Further, lithium can be retained on the negative electrode in excess to the capacity of the positive electrode. Accordingly, even when lithium is lost due to the deposition of dendrite or due to the reaction with the electrolyte solution, the drop of battery capacity can be inhibited because the negative electrode has excess lithium.

BRIEF DESCRIPTION OF THE DRAWINGS

By way of example and to make the description more clear, reference is made to the accompanying drawings in which.

DETAILED DESCRIPTION OF THE INVENTION

In accordance with the non-aqueous electrolyte secondary battery of the invention, a combination of a positive electrode provided with excess lithium and a negative electrode is charged to cause lithium to be deposited on the negative electrode.

Lithium can be directly deposited, e.g., on the current collector of negative electrode. In this case, a battery which has a high energy density and hardly shows deposition of dendrite can be provided. The reason why the foregoing battery hardly shows deposition of dendrite unlike the battery assembled from a negative electrode laminated with metallic lithium is that the metallic lithium deposited on the negative electrode in the battery during charge does not come in contact with air in the atmosphere, preventing the formation of a thick uneven oxidized film on the surface thereof. As the current collector of negative electrode, copper, nickel, stainless steel or the like may be used. Among these materials, copper and nickel are particularly excellent in electronic conductivity and uniformity in deposition of lithium. The current collector of the negative electrode may be in the form of nonporous foil or any of expanded metal, punching metal, foamed material, sintered porous material, etc. Among these forms, the nonporous foil is particularly excellent in uniformity in deposition of lithium.

Alternatively, lithium may be deposited on another negative active material provided in a negative electrode which has been assembled into a battery. In this arrangement, when the battery is assembled, the amount of lithium ion which a positive electrode can release must be more than that of lithium ion which the negative active material can absorb in order to deposit metallic lithium on the negative active material by charge. The foregoing amount of lithium ion which a positive electrode can release includes the amount of lithium ion dissolves from metallic lithium when metallic lithium is electrically connected to the positive electrode. In this arrangement, the lithium film formed on the negative active material is extremely thin and uniform in thickness, making it possible to provide a battery which is less subject to deposition of dendrite. As the negative active material, there may be used a metal alloyable with lithium such as Al, Si, Pb, Sn, Zn and Cd, tin oxide, transition metal oxide such as $LiFe_2O_3$, $WO_2$ and $MoO_2$, carbon-based material such as graphite and low crystallinity carbon, lithium nitride such as $Li_5(Li_3N)$ or any mixture thereof. The form of such a negative active material is not specifically limited but may be sphere, fiber, bulk, scale or needle.

In accordance with the present invention, by charging a positive electrode provided with excess lithium in combination with a negative electrode, lithium can be charged on the negative electrode in an amount exceeding the charge-discharge capacity of the battery. Accordingly, the negative electrode can be provided with excess lithium, making it possible to inhibit the drop of battery capacity due to charge-discharge cycle, even if the charge-discharge efficiency of the metallic lithium negative electrode is not sufficient.

In the invention, in order to provide the positive electrode with metallic lithium in advance, it is effective to electrically connect metallic lithium to the positive electrode. In some detail, a metallic lithium foil may be pressure-bonded to the positive electrode. Alternatively, the positive electrode may be connected with a conductor or the like to a metallic lithium plate provided in places other than on the positive electrode in the battery.

Even when the metallic lithium is covered with a thick ununiform oxidized surface film, the battery properties cannot be adversely affected. This is because that this metallic lithium is dissolved only by charging and lithium is not deposited on the metallic lithium during discharge, eliminating the necessity of considerably uniform current distribution. Accordingly, unlike the conventional method involving the assembly of a battery from a negative electrode provided with a metallic lithium foil, the method of the invention does not require the use of an inert gas atmosphere such as argon in any of preparation of metallic lithium, transportation and assembly of battery, making it possible to drastically reduce the production cost of battery.

Examples of the positive active material to be incorporated in the positive electrode include inorganic compounds and organic compounds. Examples of the inorganic compounds include a composite oxide represented by the composition formula $Li_xMO_2$ or $Li_yM_2O_4$ (in which M represents a transition metal; x represents a number of from 0 to 1 ($0 \leq x \leq 1$); and y represents a number of from 0 to 2

($0 \leq y \leq 2$)), an oxide having tunnel-like pores or a layer metal chalcogenide. Specific examples of these inorganic compounds include $LiCoO_2$, $LiNiO_2$, $LiMnO_2$, $LiMn_2O_4$, $Li_2Mn_2O_4$, $MnO_2$, $FeO_2$, $V_2O_5$, $V_6O_{13}$, $TiO_2$, $TiS_2$, $NiOOH$, $FeOOH$, and $FeS$. Examples of organic compound to be used as the positive active material include electrically-conductive polymers such as polyaniline. These active materials may be used singly or in combination of two or more thereof.

In the case where a compound free of lithium such as $MnO_2$, $FeO_2$, $V_2O_5$, $V_6O_{13}$, $TiO_2$, $TiS_2$, $NiOOH$, $FeOOH$ and $FeS$ is assembled into a battery while being charged, it is usual that a compound capable of supplying lithium such as metallic lithium must be used as a negative active material. However, the preparation process of the invention comprises assembling a battery from a positive electrode to which metallic lithium is electrically connected, eliminating the necessity of providing the negative electrode with metallic lithium during battery assembly. In this arrangement, in order to cause the negative electrode to be charged in an amount exceeding the charge-discharge capacity of the battery, metallic lithium must be electrically connected to the positive electrode in an amount exceeding the capacity of the positive active material. The metallic lithium thus deposited on the negative electrode does not come in contact with air in the atmosphere and thus does not form a thick ununiform oxidized surface film thereon. As a result, the deposition of dendrite on the negative electrode due to concentration of current onto the negative electrode during charge can be inhibited, making it possible to provide a battery having excellent cycle life performance.

In the case where a battery is assembled from a compound free of lithium while being charged, a large amount of metallic lithium must be received in the battery because only metallic lithium is a lithium supply source. On the contrary, in the case where a battery is assembled from a lithium-containing compound such as $LiCoO_2$, $LiNiO_2$, $LiMnO_2$, $LiMn_2O_4$, $Li_2Mn_2O_4$, etc. while being discharged, only a small amount of metallic lithium is required as compared with the case where a compound free of lithium is used, because lithium is supplied both from the lithium-containing compound and the metallic lithium. Accordingly, a larger amount of the positive active material can be received in the battery in view of the reduction in the amount of metallic lithium, making it possible to provide a battery having a high energy density. Thus, in the case where a battery is assembled from a positive active material while being discharged, lithium can be charged onto the negative electrode in an amount exceeding the charge-discharge capacity of the battery only by electrically connecting a small amount of metallic lithium to the positive electrode because the positive active material contains lithium.

In the case where the positive electrode is provided with metallic lithium as mentioned above, nickel, stainless steel or any other metals which do not form an alloy with lithium is preferably used as a current collector of positive electrode. In the case where aluminum is used as a current collector of positive electrode, charging is preferably initiated within 2 hours from the contact of the positive electrode with the electrolyte.

In the case where lithium cobalt oxide or lithium nickel oxide is used as a positive electrode, aluminum is normally used as a positive electrode current collector material excellent in oxidation resistance because the positive electrode potential is very noble. However, when the electrolyte solution is injected into the battery comprising the positive electrode electrically connected to metallic lithium, the metallic lithium is dissolved and aluminum absorbs lithium to form an alloy resulting in a violent volume expansion. When the battery is subsequently charged, aluminum releases lithium to undergo volume shrinkage. During this process, aluminum can undergo atomization or cracking that deteriorates its current collecting capacity. However, by initiating charge within 2 hours from the battery assembly, the positive electrode potential can be raised before the absorption of lithium by aluminum, making it possible to inhibit the alloying of aluminum.

As another effective method for providing the positive electrode with excess lithium there may be used a method involving the use of lithium nickel oxide having lithium atoms and oxygen atoms at a ratio of from greater than 0.5 to not greater than 1 by number or lithium manganese spinel having lithium atoms and oxygen atoms at a ratio of from greater than 0.25 to not greater than 0.5 by number as a positive active material.

As the positive active material to be used in lithium ion battery there is often used lithium nickel oxide represented by the general formula $Li_xNiO_2$ or lithium manganese spinel represented by the general formula $Li_yMnO_4$.

The ratio of number of nickel atoms to oxygen atoms in lithium nickel oxide represented by the general formula $Li_xNiO_2$ is not necessarily 1:2. Lithium nickel oxide having lithium atoms and oxygen atoms at a ratio deviating from the above value may be used as a positive active material for lithium ion battery. Further, the ratio of number of manganese atoms to oxygen atoms in lithium manganese spinel represented by the general formula $Li_yMn_2O_4$ is not necessarily 1:2. Lithium manganese spinel having manganese atoms and oxygen atoms at a ratio deviating from the above value may be used as a positive active material for lithium ion battery.

It is reported that when a positive active material represented by $Li_xNiO_2$ ($0 \leq x \leq 2$) or $Li_yMn_2O_4$ ($0 \leq y \leq 2$) is discharged, it shows a drastic change in potential at x or y value of around 1, giving a discharge curve having a two-stage plateau (Solid State Ionics 44 (1990) 87).

Since these positive active materials undergo dielectronic reaction, a very large theoretical capacity can be obtained. However, when both the two stages of the two-stage plateau are used, a sufficient cycle life performance cannot be obtained, and a sufficient high rate charge and discharge perforce cannot be obtained at the less noble potential plateau. For the reason that the energy density of the battery cannot be enhanced at the less noble potential plateau because the potential of the plateau is less noble or like reasons, only a nobler potential plateau where x or y is from not smaller than 0 to not greater than 1 ($0 \leq x \leq 1$ and $0 \leq y \leq 1$) is mainly used in lithium ion battery.

However, when the ratio of number of lithium atoms to number of oxygen atoms in lithium nickel oxide represented by the general formula $Li_xNiO_2$ is greater than 0.5, i.e., when x is from greater than 1 to not greater than 2 ($1 < x \leq 2$), charge can be made until x reaches a range of from not smaller than 0 to not greater than 1 ($0 \leq x \leq 1$) without the foregoing problem if the charge is carried out only one time. Thereafter, when charge and discharge are made in a range where the positive electrode potential does not move to the less noble potential plateau, i.e., $0 \leq x \leq 1$, the foregoing problem which would occur with the use of both the two stages of the two-stage plateau can be avoided.

In accordance with the invention, the replacement of a positive active material which is normally used in the form of $LiNiO_2$ and is used only in a nobler potential plateau by $Li_xNiO_2$ ($1<x\leq 2$) having excess lithium makes it possible to cause a negative electrode to be precharged with the excess lithium during first charge after battery assembly.

Even when the ratio of number of lithium atoms to number of oxygen atoms in lithium manganese spinel represented by the general formula $Li_yMn_2O_4$ is higher than 0.25, i.e., when x is from greater than 1 to not greater than 2 ($1<x\leq 2$), the negative electrode can be precharged with excess lithium during first charge after battery assembly similarly to the case of lithium nickel oxide.

Some of lithium, nickel and manganese atoms constituting lithium nickel oxide and lithium manganese spinel to be used in the invention may be replaced by other elements. For example, $Li_xNiO_{0.8}Co_{0.2}O_2$ ($1<x\leq 2$) and $Li_yMn_{1.5}Ni_{0.5}O_4$ ($1<y\leq 2$) are included in examples of lithium nickel oxide and lithium manganese spinel defined herein. In the invention, similar effects can be exerted regardless of whether or not lithium nickel oxide or lithium manganese spinal is substituted.

The ratio of number of lithium atoms to number of oxygen atoms in lithium nickel oxide to be used herein is more preferably from not smaller than 0.65 to not greater than 0.9 taking into account the energy density and cycle life performance of the battery. Further, the ratio of number of lithium atoms to number of oxygen atoms in lithium manganese spinel to be used herein is more preferably from not smaller than 0.325 to not greater than 0.45.

As the method for preparing the foregoing lithium nickel oxide there may be used a method which comprises electrochemically intercalating lithium into $LiNiO_2$. Alternatively, a method may be used which comprises stirring $LiNiO_2$ powder in a hexane solution of n-butyl lithium so that lithium is chemically intercalated into $LiNiO_2$. The foregoing lithium intercalation method involving chemical reduction with a reagent without any electrochemical reaction can be effected more easily than the electrochemical method and thus is suitable for mass production. Therefore, the foregoing lithium intercalation method involving chemical reduction is a very excellent method.

As the positive active material, the following material may be used as well. As the positive active material there may be used, if it is an inorganic compound, a composite oxide represented by the composition formula $Li_xMO_2$ or $Li_yM_2O_4$ (in which M represents a transition metal; x represents a number of from 0 to 1 ($0\leq x\leq 1$), and y represents a number of from 0 to 2 ($0\leq y\leq 2$), an oxide having tunnel-like pores or a layer metal chalcogenide. Specific examples of these inorganic compounds include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, $TiS_2$, $NiOOH$, $FeOOH$, $FeS$, $LiMnO_2$. Examples of organic compound to be used as the positive active material include electrically-conductive polymers such as polyaniline. These active materials may be used singly or in combination of two or more thereof regardless of which they are inorganic or organic.

The battery comprising the foregoing lithium nickel oxide or lithium manganese spinel is preferably charged and discharged in a range where the positive electrode potential does not move to the less noble potential plateau (i.e., $0\leq x\leq 1$). Accordingly, it is preferred that the battery be finished with discharge before the battery voltage falls to less than 2V, if the positive electrode is provided with lithium nickel oxide, or less than 3V, if the positive electrode is provided with lithium manganese spinel.

The electrolyte to be used in the battery of the invention is not specifically limited. Examples of the electrolyte include a liquid electrolyte, porous polymer electrolyte, solid electrolyte or the like. Particularly preferred among these electrolytes is porous polymer electrolyte. The term "porous polymer electrolyte" as used herein is meant to indicate a porous polymer which is ionically conductive in portions other than pores. The battery according to the invention needs to be first charged so that excess lithium provided on the positive electrode moves to the negative electrode as a precharge. Before the beginning of charge, the negative electrode has no particulate metallic lithium present thereon and hence a small reaction surface area. Therefore, the negative electrode has an enhanced current density and hence undergoes a large polarization, sometimes making it easy for metallic lithium to be deposited thereon in the form of dendrite. By reducing charge current, the deposition of lithium in the form of dendrite can be inhibited. However, it takes much time to charge the battery. Thus, it is disadvantageous in that batteries may not be mass-produced efficiently.

When such a porous polymer electrolyte is provided between the positive electrode and the negative electrode, lithium ionic conduction can be provided not only in the electrolyte in the pores of the polymer electrolyte but also in the polymer itself, giving a high coefficient of ionic diffusion between the positive electrode and the negative electrode. Accordingly, the ion concentration gradient between the positive electrode and the negative electrode is reduced, inhibiting the concentration polarization and hence lithium is hardly deposited in the form of dendrite. As a result, the use of such a porous polymer electrolyte makes it possible to increase current during first charge without causing the deposition of dendrite on the negative electrode. Thus, batteries can be further efficiently mass-produced. The porous polymer electrolyte preferably has a porosity of from 10% to 90% and a pore diameter of from not smaller than 0.003 $\mu$m to not greater than 10 $\mu$m.

As the polymer to be used in the porous polymer electrolyte there may be used the following polymers, singly or in admixture: polyether such as poly(ethylene oxide) and poly(propylene oxide), polyacrylonitrile, poly(vinylidene fluoride) (PVdF), poly(vinylidene chloride), poly(methyl methacrylate), poly(methyl acrylate), poly(vinyl alcohol), polymethacrylonitrile, poly(vinyl acetate), poly(vinyl pyrrolidone), polyethylenimine, polybutadiene, polystyrene, polyisoprene, styrene-butadiene rubber, nitrile rubber, and derivative thereof. Alternatively, a polymer obtained by the copolymerization of various monomers constituting the foregoing polymers may be used.

The electrolyte solution to be used in the battery according to the invention is not specifically limited. For example, a polar solvent such as ethylene carbonate, propylene carbonate, dimethyl carbonate, diethyl carbonate, methyl ethyl carbonate, γ-butyrolactone, sulfolane, dimethyl sulfoxide, acetonitrile, dimethylformamide, dimethyl acetamide, 1,2-dimethoxyethane, 1,2-diethoxyethane, tetrahydrofuran, 2-methyltetrahydrofuran, dioxolane and methyl acetate or mixture thereof may be used.

Examples of the lithium salt to be incorporated in the electrolyte solution include a lithium salt such as $LiPF_6$, $LiBF_4$, $LiAsF_6$, $LiClO_4$, $LiSCN$, $LiI$, $LiCl$, $LiBr$, $LiCF_3CO_2$, $LiCF_3SO_3$, $LiN(SO_2CF_3)_2$, $LiN(SO_2CF_2CF_3)_3$, $LiN(COCF_3)_2$ and $LiN(COCF_2CF_3)_2$ or mixture thereof. In the case where as the electrolyte there is used a porous polymer or in the case where as the solid polymer electrolyte there is used a porous solid polymer electrolyte membrane, the electrolyte solution to be incorporated in the polymer and the electrolyte solution to be incorporated in the pores may differ from each other.

The electrolyte solution preferably comprises hydrogen halide incorporated therein. The incorporation of hydrogen halide in the electrolyte solution causes the formation of a lithium halide film having a very small and uniform thickness on lithium deposited on the negative electrode during charge, making the current distribution during charge and discharge very uniform and hence making it possible to provide a battery excellent in the charge and discharge efficiency and cycle life performance of negative electrode. The hydrogen halide concentration in the electrolyte solution is preferably from 0.1 to 10 mM. As the hydrogen halide, any of hydrogen fluoride, hydrogen chloride, hydrogen bromide and hydrogen iodide may be used advantageously.

Desirable effects can be exerted particularly when the electrolyte solution comprises a complex containing the foregoing hydrogen halide incorporated therein. In this case, even when the hydrogen halide in the electrolyte solution is consumed for the chemical reaction with the electrode, the hydrogen halide in the complex dissociates according to dissociation equilibrium, keeping the amount of free hydrogen halide in the electrolyte solution constant. The concentration of the complex containing hydrogen halide in the electrolyte solution is preferably from 0.1 to 50 mM.

Examples of the complex containing hydrogen halide include one containing any of hydrogen fluoride, hydrogen chloride, hydrogen bromide and hydrogen iodide. A hydrogen halide complex of tetraalkylammonium salt is particularly effective because it can be easily dissolved in a non-aqueous electrolyte solution. Examples of the hydrogen halide complex of tetraalkylammonium salt include hydrogen halide complex of tetraethylammonium fluoride to advantage in particular. In some detail, ammonium complex of $(C_2H_5)_4NF(HF)_4$ may be used. The ethyl group in this ammonium complex may be replaced by methyl group or propyl group. The hydrogen halide to be oriented as a ligand may be any of hydrogen fluoride, hydrogen chloride, hydrogen bromide and hydrogen iodide. The number of hydrogen halide molecules to be oriented as ligands in the complex is not necessarily 4 but may be from 1 to 4.

As a shortcircuiting-inhibiting material to be used in the battery according to the invention there may be used an insulating microporous polyolefin membrane impregnated with anelectrolyte solution. Besides such an insulating microporous polyolefin membrane, there may be used the foregoing porous polymer, solid polymer electrolyte or gel-like electrolyte comprising a solid polymer electrolyte impregnated with an electrolyte solution. These materials can act as a shortcircuiting-inhibiting material as well. Alternatively, an insulating microporous membrane and a solid polymer electrolyte may be used in combination.

The battery according to the invention may have a structure comprising a single sheet or a plurality of sheets of positive electrode and negative electrode laminated on each other. Alternatively, the battery may have a structure obtained by spirally winding a laminate of a positive electrode and a negative electrode. Excellent among these structures is the laminate of a plurality of sheets of positive electrode and negative electrode because it gives a high energy density and uniformly compressed electrode and can inhibit the exfoliation of surface film on lithium during charge and discharge.

The battery according to the invention may comprise a case which is rectangular or cylindrical. Alternatively, the battery case may be formed by working a sheet-like material into an envelope or by working a sheet of a metal such as aluminum coated with a resin. The battery case may be made of iron instead of aluminum. Alternatively, the battery case may be a sheet obtained by coating a foil of a metal such as aluminum with a resin. Excellent among these battery cases is the rectangular case because the electrodes can be uniformly compressed, making it possible to inhibit the exfoliation of surface film on lithium during charge and discharge. Excellent among these case materials is aluminum because when the battery case made of aluminum acts as a positive electrode terminal, the deposition of lithium on the battery case can be inhibited.

In accordance with the invention, the provision of a membrane comprising carbon particles or particles of tin, aluminum or silicon, which forms an alloy with lithium, between the positive electrode and the negative electrode makes it possible to allow the particles to absorb lithium even when particulate lithium grows from the negative electrode toward the positive electrode and hence inhibit shortcircuiting and improve cycle life performance.

A lithium secondary battery 1 which is one embodiment of the present invention (corresponding to the non-aqueous electrolyte secondary battery of the invention; hereinafter occasionally referred simply to as "battery 1") will be described in connection with FIGS. 1 and 2.

Figure 1:
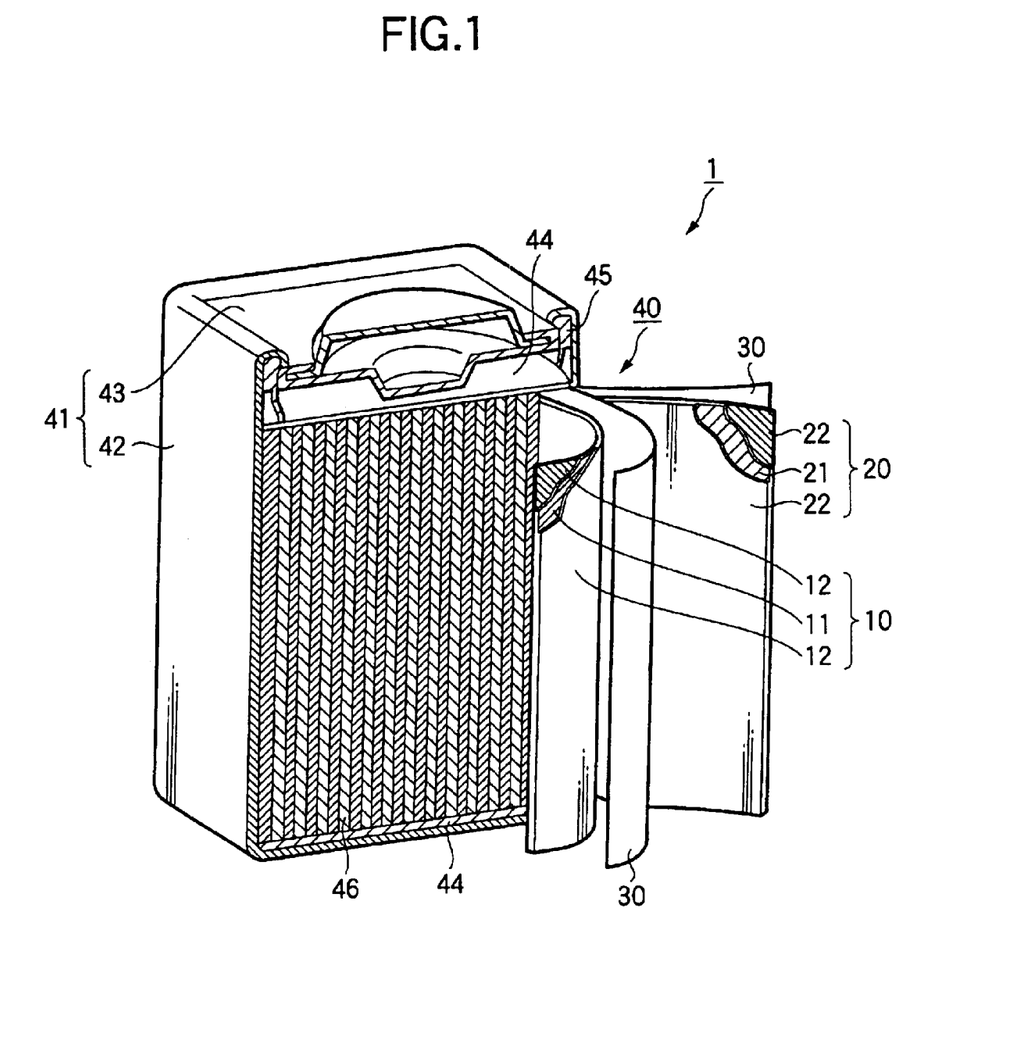
FIG. 1 is a broken diagram illustrating a lithium secondary battery in completed form.
Figure 2:
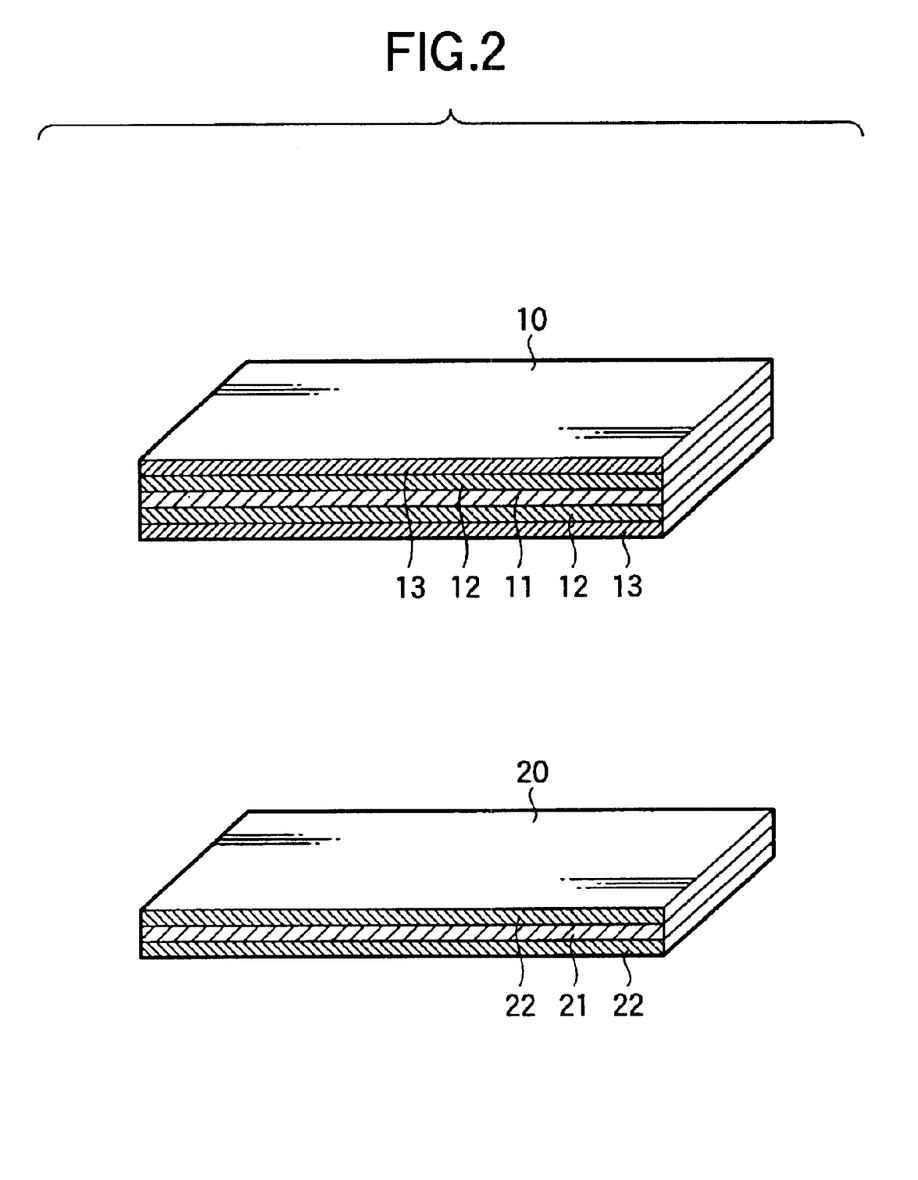
FIG. 2 is a diagram illustrating a positive electrode and a negative electrode to be assembled.

FIG. 1 is a broken diagram of a battery 1 in completed form. This lithium secondary battery 1 comprises a square battery can 41 formed by a metal and an electrode 40 received in the battery can. The battery can 41 comprises a closed-end square-shaped negative electrode case 42 and a rectangular metal positive electrode cap 43 which closes the opening of the negative electrode case 42. The electrode 40 is formed by laminating a belt-shaped electrode 10 for positive electrode (corresponding to the positive electrode of the invention) with an electrode 20 for negative electrode (corresponding to the negative electrode of the invention) with a separator 30 interposed therebetween. The electrode 40 is received in the negative electrode case 42 with a rectangular insulating plate 44 disposed above and below the electrode. The opening of the negative electrode case 42 is caulked to a positive electrode cap 43 with a sealing gasket 45 interposed therebetween.

The inner part of the battery can 41 is filled with anelectrolyte solution 46 (corresponding to the electrolyte of the invention) obtained by adding 1 mol/l of $LiPF_6$ to a 1:1 (by volume) of ethylene carbonate (EC) and dimethoxyethane, and then adding to the mixture $(C_2H_5)_4NF(HF)_4$ as HF complex in a concentration of 5 mM.

The electrode 10 for positive electrode comprises a current collector of positive electrode 11 having a positive active material layer 12 containing, e.g., lithium cobalt oxide as a positive active material formed on both sides thereof. From the electrode 10 for positive electrode leads a positive electrode lead (not shown) which is connected to the positive electrode cap 43.

The electrode 20 for negative electrode comprises a current collector of negative electrode 21 having a negative active material layer 22 containing, e.g., graphite powder as a negative active material formed on both sides thereof. The negative active material in the negative active material layer 22 has lithium deposited thereon. From the electrode 22 for negative electrode leads a negative electrode lead (not shown) which is connected to the bottom of the negative electrode case 42.

The process for the preparation of the battery 1 will be described hereinafter.

An electrode 10 for positive electrode is prepared. To lithium cobalt oxide are added a poly(vinylidene fluoride) as a binder and an acetylene black as an electrically-conducting agent. The mixture is then kneaded to make a paste. The paste thus prepared is applied to both sides of a current collector of positive electrode 11, and then dried. The coated current collector is rolled by a roller press, and then cut into a strip having a predetermined width. Thus, a belt-shaped electrode 10 for positive electrode having a positive active material layer 12 laminated on both sides of the current collector of positive electrode 11 is formed. A metallic lithium foil 13 having a predetermined size is then pressure-bonded to the surface of the positive active material layer 12 (see FIG. 2).

Subsequently, an electrode 20 for negative electrode is prepared. A graphite powder is kneaded with a poly (vinylidene fluoride) as a binder to make a paste. The paste thus prepared is applied to both sides of a current collector of negative electrode 21 made of, e.g., copper foil having a thickness of 12 μm, and then dried. The coated current collector is rolled by a roller press, and then cut into a strip having a predetermined width. Thus, a belt-shaped electrode 20 for negative electrode having a negative active material layer 22 laminated on both sides of the current collector of negative electrode 21 is formed (see FIG. 2).

The electrodes 10 and 20 are then laminated with a separator 30 interposed therebetween to prepare an electrode 40. The electrode 40 thus prepared is then received in a negative electrode case 42. The assembly of battery is then conducted according to a known method.

Subsequently, the lithium secondary battery 1 is charged. During this procedure, in the electrode 10 for positive electrode, the metallic lithium foil 13 bonded to the positive active material layer 12 is eluted into an electrolyte solution 46 in the form of lithium ion. Thereafter, the lithium cobalt oxide in the positive active material layer 12 is charged. On the other hand, in the electrode 20 for negative electrode, the graphite in the negative active material layer 22 is charged. Thereafter, metallic lithium is deposited on the graphite.

In this manner, a battery 1 is completed.

The present invention will be further described in the following examples, but the present invention should not be construed as being limited thereto.

EXAMPLE 1

A mixture of 70 wt-% of lithium cobalt oxide as a positive active material, 6 wt-% of an acetylene black as an electrically-conducting material, 9 wt-% of a poly (vinylidene fluoride) (PVDF) as a binder and 15 wt-% of n-methylpyrrolidone (NMP) as a solvent for dissolving a binder was applied to an aluminum foil having a width of 110 mm and a thickness of 20 μm, and then dried at a temperature of 150° C. to cause NMP to evaporate. The foregoing procedure was made on both sides of a current collector of positive electrode made of an aluminum foil. The coated current collector of positive electrode was then pressed to prepare a positive electrode. As a current collector of negative electrode, a copper foil having a thickness of 10 μm and a width of 21 mm was prepared, which was then used as a negative electrode as it was. The positive electrode and negative electrode thus prepared were then each cut into a size that can be received in a rectangular case and in such an arrangement that the active material layer was rectangular. The positive electrode and negative electrode were provided with an aluminum foil tab and a copper foil tab of current collector to which a lead is connected, respectively.

The positive electrode thus prepared was then laminated with a metallic lithium foil having a thickness of 20 μm on the active material layer on both sides thereof. In this arrangement, metallic lithium was brought into direct contact with the positive electrode so that the positive electrode was electrically connected to metallic lithium. Subsequently, a polyethylene separator having a thickness of 25 μmm was used to prepare a rectangular bag. The current collector of negative electrode was inserted into the bag. A plurality of sheets of the negative electrode and a plurality of sheets of the positive electrode were then alternately laminated with each other. A positive electrode lead and a negative electrode lead were then ultrasonically welded to the positive electrode and negative electrode, respectively. The laminate of positive electrode and negative electrode thus prepared was then inserted in a rectangular aluminum case having a height of 47.0 mm, a width of 22.2 mm and a thickness of 7.0 mm. The battery case was allowed to act as a positive electrode terminal. The positive electrode positioned at the end of the laminate of positive electrode and negative electrode was brought into contact with the battery case to make conduction. A negative electrode lead was ultrasonically welded to a negative electrode terminal positioned at the cover of the battery case. The cover was then laser-welded to the battery case. Ethylene carbonate (EC) and dimethoxyethane (DME) were mixed at a volume ratio of 1:1. To the mixture was then added 1 mol/l of $LiPF_6$. To the mixture was then added $(C_2H_5)_4NF(HF)_4$ as HF complex in a concentration of 5 mM to prepare an electrolyte solution. The electrolyte solution thus prepared was then injected into the battery case through an injection port having a diameter of 1 mm formed in the battery case. The injection port was then sealed by laser welding. The foregoing aluminum case was provided with a groove (so-called irrecoverable safety valve) so that when the inner pressure in the battery rises, the battery case is cracked at the groove to release gas and hence prevent the battery case from rupturing. The battery thus sealed was charged with a current of 90 mA to 4.3 V, and then charged at a constant voltage of 4.3 V for 5 hours. The time between the injection of the electrolyte solution and the beginning of charge was within 1 hour. The battery thus completed had a capacity of about 900 mAh. The battery assembly, including the handling of metallic lithium, was conducted in dried air at a dew point of not higher than −50° C. In this manner, a battery (A) according to the invention was prepared.

A conventional known comparative battery (B) was prepared in the same manner as the battery (A) except that the metallic lithium foil was laminated on the copper foil as current collector of negative electrode instead of on the positive electrode during battery assembly.

Figure 3:
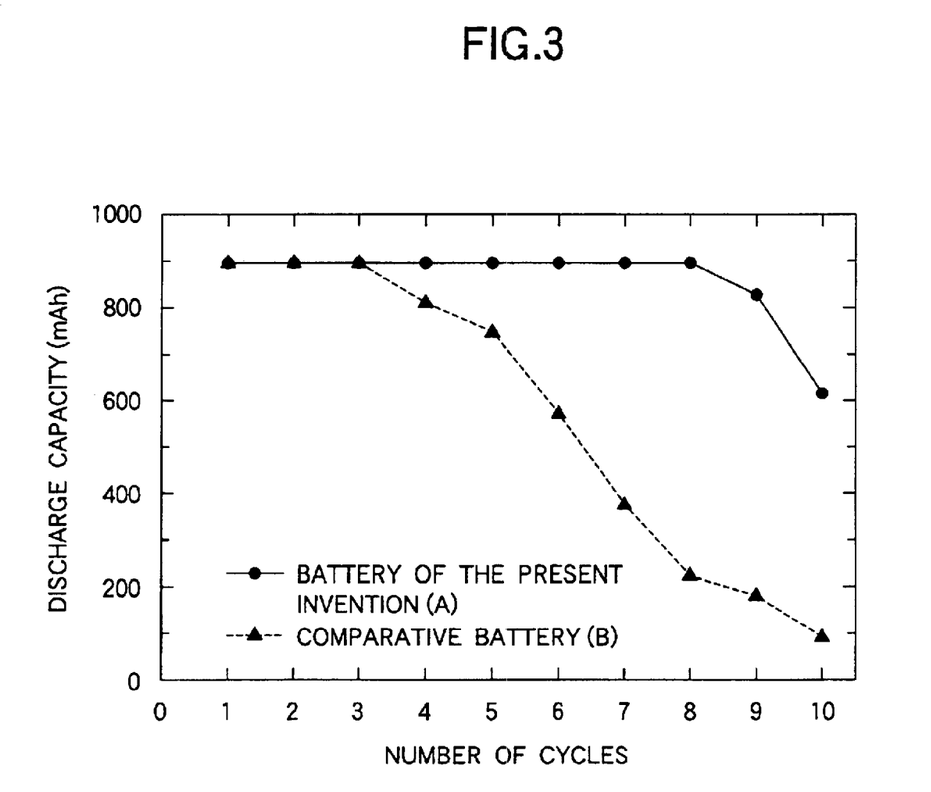
FIG. 3 is a graph illustrating the cycle life performance of the battery (A) of the invention and the comparative battery (B) of Example 1.

The battery (A) according to the invention and the comparative battery (B) thus prepared were each then measured for internal resistance by means of a resistance meter which applies an alternating current having a frequency of 1 kHz to the battery. As a result, the battery (A) exhibited an internal resistance of 217 mΩ while the comparative battery (B) exhibited an internal resistance of 718 mΩ. These results are presumably attributed to the fact that the battery of the invention has no oxidized surface film of metallic lithium on the interface of the current collector of negative electrode with metallic lithium because metallic lithium has been deposited on the negative electrode during charge while the comparative battery has a high contact resistance because metallic lithium having an oxidized surface film present thereon has been laminated on the current collector of negative electrode. These batteries were each subjected to 10-cycle life test. In this life test, constant current charge with 45 mA to 4.3 V and subsequent two hour constant voltage charge at 4.3 V and 45 mA constant current discharge to 3.0 V constitute one cycle. The results of cycle life test on these batteries are shown in FIG. 3. It can be seen in FIG. 3 that the battery according to the invention exhibit an improved cycle life performance as compared with the comparative battery. The batteries which had thus been subjected to cycle life test were each disassembled. As a result, the battery (A) of the invention was found to have metallic lithium uniformly deposited on the negative electrode and thus have no dendrite-like lithium present thereon while the comparative battery (B) was found to have a large amount of dendrite-like metallic lithium present on the negative electrode. These results are presumably attributed to the fact that since the battery assembly was conducted in air, metallic lithium having a thick oxidized surface film formed thereon to a ununiform thickness was used as a negative electrode, causing lithium to be deposited mainly on thin oxidized surface film area in the form of dendrite during charge and hence making it impossible to obtain a sufficient negative electrode charge and discharge efficiency. On the contrary, in the battery (A) of the invention, a thick ununiform oxidized surface film is formed on metallic lithium during battery assembly similarly to the comparative battery (B). However, since the metallic lithium is laminated on the positive electrode instead of the negative electrode, the negative electrode has no thick ununiform oxidized surface film of lithium present thereon, making it possible to effect uniform deposition of lithium on the negative electrode and obtain an excellent negative electrode charge and discharge efficiency.

The same effect as that of lithium cobalt oxide was also exerted when lithium nickel oxide or lithium manganese spinel was used instead of lithium cobalt oxide as the positive active material in discharged state.

EXAMPLE 2

Figure 4:
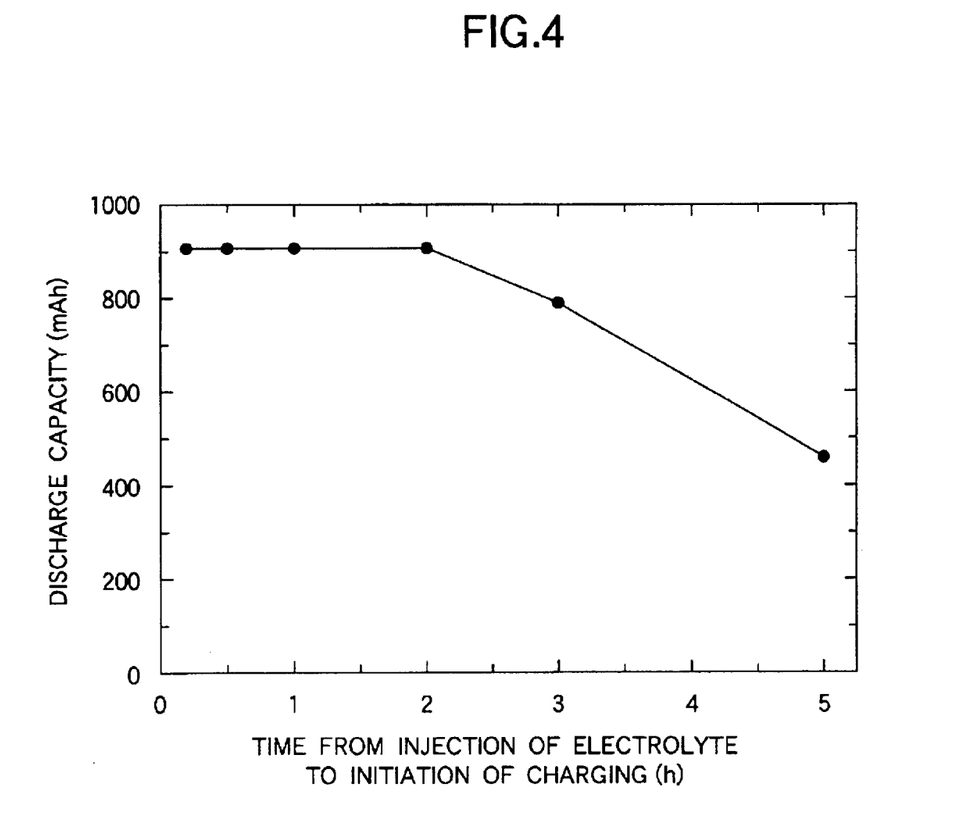
FIG. 4 is a graph illustrating the relationship between the discharge capacity and the time between the injection of electrolyte solution and the beginning of charge of the batteries (C), (D), (E), (F) and (G) of Example 2.

Batteries (C), (D), (E), (F), (G) and (H) were prepared in the same manner as the battery (A) according to the invention of Example 1 except that the time between the injection of the electrolyte solution and the beginning of charge was 10 minutes, 30 minutes, 1 hour, 2 hours, 3 hours or 5 hours. These batteries were each then subjected to constant current discharge test with 900 mA to 3.0 V. The relationship between the discharge capacity during this test and the time the injection of the electrolyte solution and the beginning of charge is shown in FIG. 4. It can be seen in FIG. 4 that when the time between the injection of the electrolyte solution and the beginning of charge is within 2 hours, the resulting discharge capacity is almost the same as the designed value. On the other hand, when the time between the injection of the electrolyte solution and the beginning of charge exceeds 2 hours, the resulting discharge capacity is drastically reduced. The batteries thus tested were each then disassembled. As a result, when the time between the injection of the electrolyte solution and the beginning of charge is within 2 hours, the resulting batteries show no cracks occurring in the aluminum current collector of positive electrode while when the time between the injection of the electrolyte solution and the beginning of charge exceeds 2 hours, the resulting batteries showed cracks occurring in the aluminum current collector of positive electrode. It can be seen from these results that the present invention involves the predetermination of the time between the injection of the electrolyte solution and the beginning of charge to 2 hours or less, making it possible to inhibit the absorption of lithium by the aluminum current collector of positive electrode and hence inhibit the deterioration of battery properties.

EXAMPLE 3

Batteries (I), (J) and (K) comprising a negative electrode provided with graphite the reversible capacity of which is 1%, 10% and 99% of the capacity of metallic lithium electrically connected to the positive electrode, respectively, were prepared in the same manner as the battery (A) of the invention of Example 1 except that a graphite powder was applied to the current collector of negative electrode as a lithium-absorbable material. Further, batteries (L), (M) and (N) comprising a negative electrode provided with graphite the reversible capacity of which is 1%, 10% and 99% of the capacity of metallic lithium electrically connected to the positive electrode, respectively, were prepared in the same manner as the comparative battery (B) of Example 1 except that a graphite powder was applied to the current collector of negative electrode as a lithium-absorbable material, followed by the lamination with a metallic lithium foil. For the measurement of the reversible capacity of graphite provided in the negative electrode, a current collector of negative electrode coated with a graphite powder prepared in the same manner as used in the trial preparation of battery was subjected to the following measurement process. In some detail, a flooded cell comprising metallic lithium as a reference electrode, excess metallic lithium as a counter electrode and a 1:1 (by volume) mixture of ethylene carbonate and diethyl carbonate containing 1 mol/l of $LiPF_6$ as an electrolyte solution was discharged at a current density of 0.2 mA/cm$^2$ to 1 V vs. Li/Li$^+$, charged at a current density of 0.1 mA/cm$^2$ to 0 V vs. Li/Li$^+$, and then discharged at a current density of 0.2 mA/cm$^2$ to 1 V vs. Li/Li$^+$. Thus, the capacity at the second discharge was defined to be the reversible capacity of the lithium-absorbable material provided in the negative electrode. The batteries prepared in Example 3 showed a battery capacity drop by the amount of reduction of the number of sheets of positive electrode and negative electrode receivable in the battery case with the increase of the amount of graphite in the negative electrode. The application of graphite powder to the current collector of negative electrode was carried out as follows. In some detail, a mixture of 81 wt-% of a graphite powder, 9 wt-% of PVDF and 10 wt-% of NMP was spray-coated onto a current collector of negative electrode. By changing the coating time, the coated amount of graphite was varied. These batteries were each then subjected to 10-cycle life test under the same conditions as used in Example 1. The ratio of the capacity at 10th cycle to that at 1st cycle is set forth in Table 1. Table 1 also shows the results of the battery (A) of the invention and the comparative battery (B) prepared in Example 1. It can be seen from Table 1 that the battery according to the invention exhibits an improved cycle life performance as compared with the comparative battery. The batteries thus tested were each then disassembled. As a result, the batteries (I), (J) and (K) according to the invention were found to have metallic lithium uniformly deposited on the negative electrode and thus have no dendrite-like lithium present thereon, while the comparative batteries (L), (M) and (N) were found to have a large amount of dendrite-like metallic lithium present on the negative electrode. These results are presumably attributed to the fact that since the battery assembly was conducted in air, metallic lithium having a thick oxidized surface film formed thereon to a ununiform thickness was used as a negative electrode, causing lithium to be deposited mainly on thin oxidized surface film area in the form of dendrite during charge and hence making it impossible to obtain a sufficient negative electrode charge and discharge efficiency. On the contrary, in the batteries of the invention, a thick ununiform oxidized surface film is formed on metallic lithium during battery assembly similarly to the comparative batteries. However, since the metallic lithium is laminated on the positive electrode instead of the negative electrode, the negative electrode has no thick ununiform oxidized surface film of lithium present thereon, making it possible to effect uniform deposition of lithium on the negative electrode and obtain an excellent negative electrode charge and discharge efficiency.

The same effect as that of graphite powder was obtained when aluminum powder, tin powder or silicon powder was used.

TABLE 1

| Battery No. | % Ratio of reversible capacity of graphite to capacity of metallic lithium | % Ratio of discharge capacity at 10th cycle to that at 1st cycle |
|---|---|---|
| Battery (A) of the invention | 0 | 69 |
| Battery (I) of the invention | 1 | 72 |
| Battery (J) of the invention | 10 | 77 |
| Battery (K) of the invention | 99 | 85 |
| Comparative battery (B) | 0 | 11 |
| Comparative battery (L) | 1 | 12 |
| Comparative battery (M) | 10 | 23 |
| Comparative battery (N) | 99 | 62 |

EXAMPLE 4

A positive electrode was prepared in the same manner as in the process for the preparation of positive electrode for the battery (A) according to the invention of Example 1 except that iron oxyhydroxide in charged state was used. The positive electrode thus prepared was then laminated with a metallic lithium foil having a thickness of 40 μm on both sides thereof. In this arrangement, metallic lithium was brought into direct contact with the positive electrode so that the positive electrode was electrically connected to metallic lithium. The capacity of the metallic lithium foil laminated on the positive electrode was twice that of the positive active material. In this manner, a positive electrode according to the invention was prepared. A battery (O) of the invention was then prepared in the same manner as the battery (A) of the invention of Example 1 except that the positive electrode was prepared as mentioned above and the positive electrode was laminated with a metallic lithium foil. In this battery, lithium is dissolved at the same time with the injection of the electrolyte solution, initiating the discharge of the positive active material. However, since the capacity of the metallic lithium laminated on the positive electrode is twice that of the positive active material, a battery having an excessive lithium negative electrode capacity with respect to the capacity of the positive electrode can be prepared by charging without previously providing the negative electrode with metallic lithium. A comparative battery (P) was prepared in the same manner as the battery (O) of the invention except that the metallic lithium foil was laminated on the current collector of negative electrode instead of the positive electrode. The battery (O) of the invention and the comparative battery (P) thus prepared were each then subjected to 10-cycle life test under the same conditions as used in Example 1. As a result, it was found that the ratio of discharge capacity at 10th cycle to that at 1st cycle of the battery (O) of the invention is 88% while that of the comparative battery (P) is 57%. These results show that the effect of the invention can be also exerted when a battery is assembled from a positive electrode for non-aqueous electrolyte battery comprising a positive active material in charged state and having metallic lithium electrically connected thereto similar to Example 1.

The same results as mentioned above were also obtained when as the positive active material in charged state there is used nickel oxyhydroxide instead of iron oxyhydroxide.

EXAMPLE 5

The positive electrode was prepared as follows. In some detail, a mixture of 70 wt-% of $LiNiO_2$ as an active material, 6 wt-% of an acetylene black as an electrically-conducting agent, 9 wt-% of a poly(vinylidene fluoride) (PVDF) as a binder and 15 wt-% of n-methylpyrrolidone (NMP) as a solvent for dissolving a binder was applied to an aluminum foil having a width of 20 mm and a thickness of 20 μm, and then dried at a temperature of 150° C. to cause NMP to evaporate. The foregoing procedure was made on both sides of an aluminum foil. The coated aluminum foil was then pressed to prepare a positive electrode. The positive electrode thus prepared was then discharged with a metallic lithium electrode as a counter electrode in an electrolyte solution obtained by dissolving 1 mol/dm³ of $LiPF_6$ in a 1:1 (by volume) mixture of ethylene carbonate (EC) and dimethoxyethanedimethylethane (DME) until the composition of the active material became $Li_{1.2}NiO_2$, $Li_{1.4}NiO_2$, $Li_{1.6}NiO_2$, $Li_{1.8}NiO_2$ and $Li_2NiO_2$, respectively, to prepare five positive electrodes. These positive electrodes were dipped in DME so that they were washed, and then dried. As a current collector of negative electrode there was prepared a copper foil having a thickness of 10 μm and a width of 21 mm which was then used as a negative electrode as it was. The positive electrode and negative electrode thus prepared were then each cut into a size that can be received in a rectangular case and in such an arrangement that the active material layer was rectangular. However, the positive electrode and negative electrode were provided with an aluminum foil tab and a copper foil tab of current collector to which a lead is connected, respectively. A porous membrane of PVDF having a thickness of 25 μmm and a pore diameter of about 1 μm was used as a membrane for preventing shortcircuiting between the positive electrode and the negative electrode. The porous membrane was then worked into a rectangular bag. The negative electrode made of copper foil current collector was then inserted into the bag. A plurality of sheets of the negative electrode and a plurality of sheets of the positive electrode were then alternately laminated with each other. A positive electrode lead and a negative electrode lead were then ultrasonically welded to the positive electrode and negative electrode, respectively. The laminate of positive electrode and negative electrode thus prepared was then inserted in a rectangular aluminum case having a height of 47.0 mm, a width of 22.2 mm and a thickness of 7.0 mm. The battery case was allowed to act as a positive electrode terminal. The positive electrode positioned at an end of the laminate of positive electrode and negative electrode was brought into contact with the battery case to make conduction. A negative electrode lead was ultrasonically welded to a negative electrode terminal positioned at the cover of the battery case. The cover was then laser-welded to the battery case. EC and DME were mixed at a volume ratio of 1:1. To the mixture was then added 1 mol/dm³ of $LiPF_6$. To the mixture was then added $(C_2H_5)_4F(HF)_4$ as HF complex in a concentration of 5 mM to prepare an electrolyte solution. The electrolyte solution thus prepared was then injected into the battery case through an injection port having a diameter of 1 mm formed in the battery case. The injection port was then sealed by laser welding. The membrane for preventing shortcircuiting made of porous PVDF membrane provided between the positive electrode and the negative electrode swelled in the electrolyte solution, providing a porous solid polymer electrolyte which is ionically-conductive not only in the electrolyte solution in the pores but also in the polymer itself. The foregoing aluminum case was provided with a groove (so-called irrecoverable safety valve) so that when the inner pressure in the battery rises, the battery case is cracked at the groove to release gas and hence prevent the battery case from rupturing. In this manner, batteries (a), (b), (c), (d) and (e) of the invention comprising as positive active material $Li_{1.2}NiO_2$, $Li_{1.4}NiO_2$, $Li_{1.6}NiO_2$, $Li_{1.8}NiO_2$ and $Li_2NiO_2$, respectively, were prepared. In these batteries, the ratio of number of lithium atoms to number of oxygen atoms in lithium nickel oxide was 0.6, 0.7, 0.8, 0.9 and 1, respectively. These batteries have different thicknesses of metallic lithium deposited by charge on the negative electrode. Accordingly, an aluminum foil was inserted into the battery case in an amount corresponding to the difference in thickness of metallic lithium so that the pressure applied to the electrode was the same from battery to battery. These battery were each charged with a current of 90 mA to 4.3 V, and then charged at a constant voltage of 4.3 V for 5 hours. The time between the injection of the electrolyte solution and the beginning of charge was within 1 hour. The batteries thus completed had a capacity of about 900 mAh. The battery assembly, including the handling of metallic lithium, was conducted in dried air at a dew point of not higher than −50° C.

A conventional known comparative battery (f) was prepared in the same manner as the batteries (a), (b), (c), (d) and (e) of the invention except that the positive electrode was not previously discharged in the electrolyte solution and the battery was assembled with the active material remaining to be $LiNiO_2$. A conventional known comparative battery (g) was prepared in the same manner as the comparative battery (f) except that the copper foil used as a negative electrode was laminated with a metallic lithium foil having a thickness of 20 μm on both sides thereof. Theoretically, the comparative battery (g) which has been charged to 4.3 V has a negative electrode provided with metallic lithium in the same amount as the battery (c) of the invention. In the comparative batteries (f) and (g), the ratio of number of lithium atoms to oxygen atoms in lithium nickel oxide is 0.5.

Figure 5:
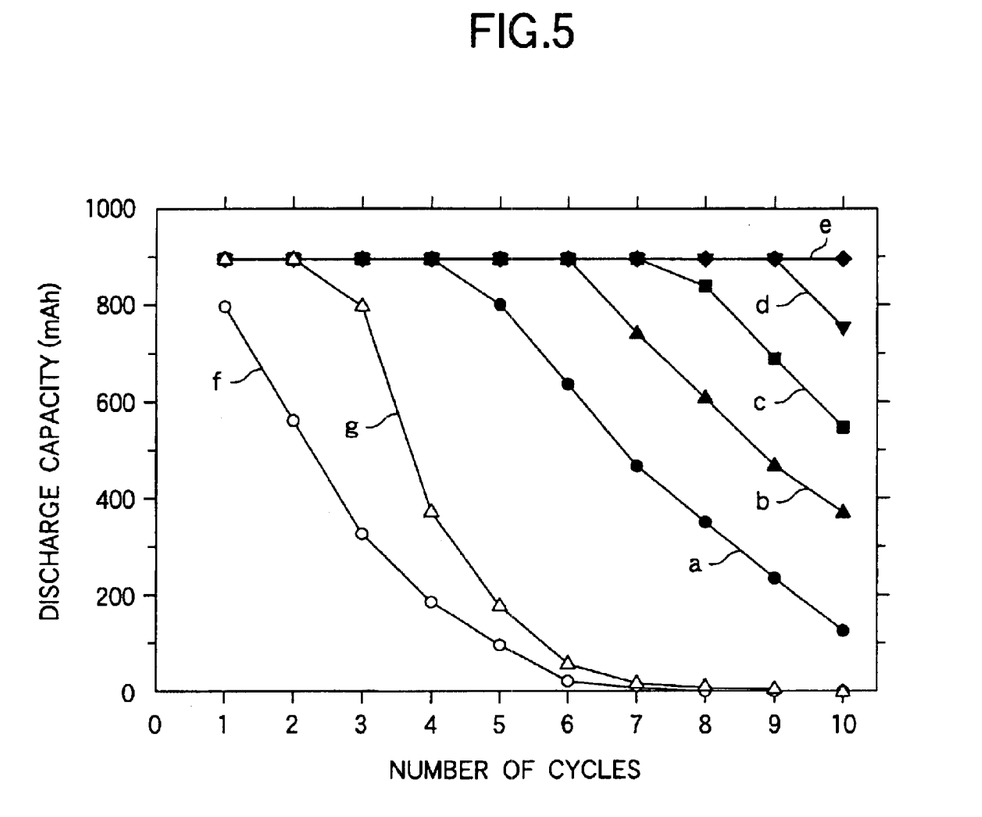
FIG. 5 is a graph illustrating the cycle life performance of the batteries (a), (b), (c), (d) and (e) of the invention and the comparative batteries (f) and (g) of Example 5.

The batteries (a), (b), (c), (d) and (e) of the invention and the comparative batteries (f) and (g) thus prepared were each then subjected to 10-cycle life test, each consisting of discharge at 450 mA to 3.1 V, constant current charge at 450 mAh to 4.3 V and 3 hour charge at 4.3 V. The results are shown in FIG. 5. It can be seen from FIG. 5 that the batteries (a), (b), (c), (d) and (e) of the invention exhibit a remarkably excellent cycle life performance as compared with the comparative batteries (f) and (g). The reason why the batteries of the invention are superior to the comparative battery (f) in respect to cycle life performance is that the batteries of the invention have excess lithium contained in the positive active material during battery assembly deposited on the negative electrode as metallic lithium which acts as a precharge during battery charge while the comparative battery (f) has no metallic lithium present on the negative electrode as precharge, causing the shortage of charge and discharge efficiency of negative electrode to be directly related to the drop of discharge capacity. The comparison of the battery (c) of the invention with the comparative battery (g) shows that although these batteries have the same precharged amount of metallic lithium present on the negative electrode after first charge, the battery (c) of the invention exhibits a remarkably excellent cycle life performance as compared with the comparative battery (g). The batteries which had been thus subjected to cycle life test were then disassembled. As a result, the battery (c) of the invention was found to have metallic lithium uniformly deposited on the negative electrode and thus have no dendrite-like lithium present thereon while the comparative battery (g) was found to have a large amount of dendrite-like metallic lithium present on the negative electrode. These results are presumably attributed to the fact that since the assembly of the comparative battery (g) was conducted in air, metallic lithium having a thick oxidized surface film formed thereon to a ununiform thickness was used as a negative electrode, causing lithium to be deposited mainly on thin oxidized surface film area in the form of dendrite during charge and hence making it impossible to obtain a sufficient negative electrode charge and discharge efficiency. On the contrary, in the battery (c) of the invention, metallic lithium is directly deposited by charge on a copper foil which is a current collector of negative electrode. Thus, the negative electrode has no thick ununiform oxidized surface film of lithium present thereon, making it possible to effect uniform deposition of lithium on the negative electrode and obtain an excellent negative electrode charge and discharge efficiency.

EXAMPLE 6

Figure 6:
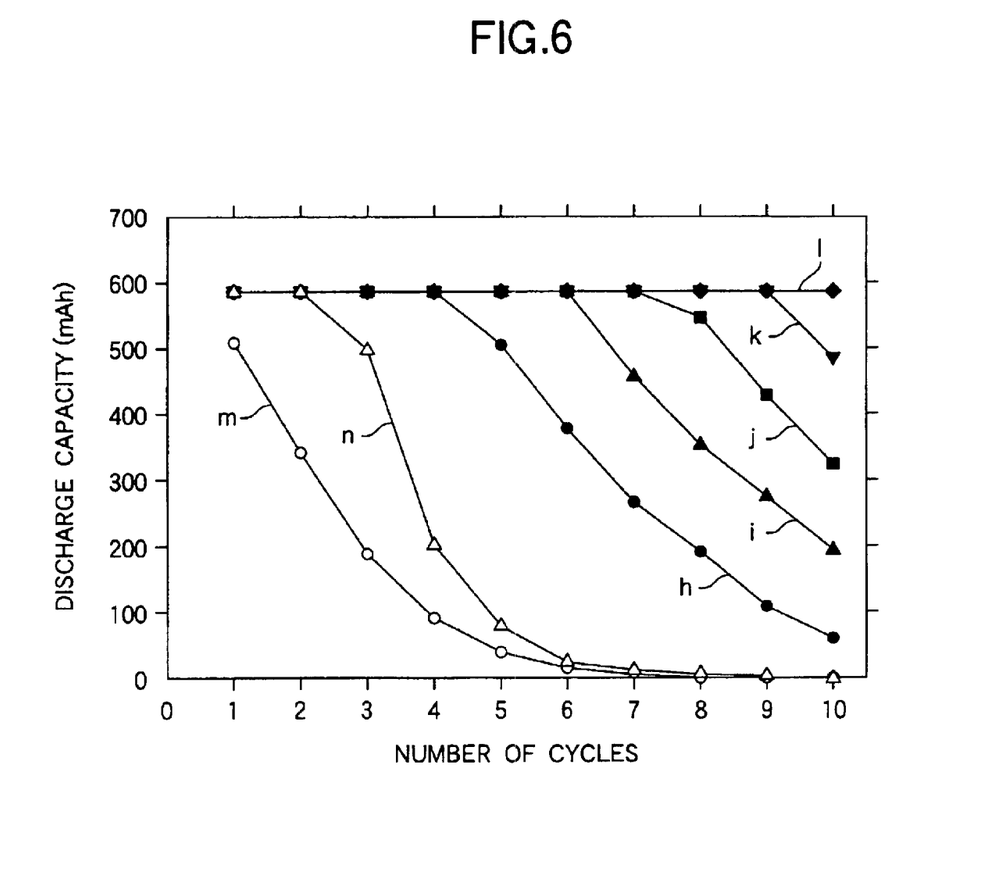
FIG. 6 is a graph illustrating the cycle life performance of the batteries (h), (i), (j), (k) and (l) of the invention and the comparative batteries (m) and (n) of Example 6.

Batteries (h), (i), (j), (k) and (l) of the invention and comparative batteries (m) and (n) were prepared in the same manner as the batteries (a), (b), (c), (d) and (e) of the invention and the comparative batteries (f) and (g) of Example 5, respectively, except that as the positive active material there was used $LiMn_2O_4$ instead of $LiNiO_2$. In the batteries (h), (i), (j), (k) and (l) of the invention, the ratio of number of lithium atoms to number of oxygen atoms in lithium manganese spinel is 0.3, 0.35, 0.4, 0.45, and 0.5, respectively. In the comparative batteries (m) and (n), the ratio of number of lithium atoms to number of oxygen atoms in lithium manganese spinel is 0.25. The battery (m) comprises no metallic lithium foil laminated on the negative electrode while the battery (n) is assembled from a negative electrode laminated with a metallic lithium foil. These batteries had a designed capacity of about 600 mAh. These batteries were each then subjected to cycle life test under the same conditions as used in Example 5. The results are shown in FIG. 6. It can be seen from FIG. 6 that the batteries (h), (i), (j), (k) and (l) of the invention exhibit a remarkably excellent cycle life performance as compared with the comparative batteries (m) and (n). This is presumably because even when $LiMn_2O_4$ is used as a positive active material, it gives the same principle as in the case of $LiNiO_2$, making the batteries of the invention better than the comparative batteries in cycle life performance.

While the invention has been described in detail and with reference to specific embodiments thereof, it will be apparent to one skilled in the art that various changes and modifications can be made therein without departing from the spirit and scope thereof.

This application is based on Japanese patent applications No. 2000-205502 filed on Jul. 6, 2000 and No. 2000-373857 filed on Dec. 8, 2000, the entire contents thereof being hereby incorporated by reference.

What is claimed is:

1. A non-aqueous electrolyte secondary battery in which metallic lithium is used as a negative active material, which comprises the following elements:

a positive electrode comprising a positive active material;

a negative electrode;

metallic lithium being in contact with said positive electrode; and an electrolyte.

2. The non-aqueous electrolyte secondary battery according to claim 1, wherein said negative electrode comprises a lithium-absorbable material.

3. The non-aqueous electrolyte secondary battery according to claim 2, comprising a porous polymer electrolyte as an electrolyte.

4. The non-aqueous electrolyte secondary battery according to claim 1, comprising a porous polymer electrolyte as an electrolyte.

5. A non-aqueous electrolyte secondary battery which is obtained by charging the non-aqueous electrolyte secondary battery according to any one of claims 1, 2, 4, and 3 to form metallic lithium on the negative electrode.

6. A process for the preparation of a non-aqueous electrolyte secondary battery comprising metallic lithium on a negative electrode, which comprises a step of assembling a positive electrode being in contact with metallic lithium and a negative electrode into a non-aqueous electrolyte secondary battery, and a step of forming metallic lithium on said negative electrode by charging the non-aqueous electrolyte secondary battery.

7. The process for the preparation of a non-aqueous electrolyte secondary battery according to claim 6, wherein said positive electrode comprises a current collector comprising aluminum.

8. The process for the preparation of a non-aqueous electrolyte secondary battery according to claim 6 or 7, wherein said charging begins within 2 hours after the contact of said positive electrode with electrolyte.

9. The process for the preparation of a non-aqueous electrolyte secondary battery according to claim 6, which comprises the steps of:

inserting a negative electrode, which substantially does not comprise metallic lithium, into a battery case, and then forming metallic lithium on said negative electrode by charging the non-aqueous electrolyte secondary battery.

10. The process for the preparation of a non-aqueous electrolyte secondary battery according to claim 6, which comprises a step of forming metallic lithium directly on a current collector of said negative electrode by charging the non-aqueous electrolyte secondary battery.

11. A process for the preparation of a non-aqueous electrolyte secondary battery comprising metallic lithium on a negative electrode, which comprises a step of assembling a positive electrode comprising a positive active material into a non-aqueous electrolyte secondary battery, said positive active material containing at least one of lithium nickel oxide having a ratio of lithium atoms to oxygen atoms within the range of from greater than 0.5 to not greater than 1 or lithium manganese spinel having a ratio of lithium atoms to oxygen atoms within the range of from greater than 0.25 to not greater than 0.5, a step of inserting said positive electrode into a battery case, a step of inserting a negative electrode, which substantially does not comprise metallic lithium, into said battery case, and a step of forming said metallic lithium on said negative electrode by charging the non-aqueous electrolyte secondary battery.

12. The process for the preparation of a non-aqueous electrolyte secondary battery according to claim 6 or 11, wherein said negative electrode comprises a lithium-absorbable material as a negative active material.

13. The process for the preparation of a non-aqueous electrolyte secondary battery according to claim 6 or 11, wherein said non-aqueous electrolyte secondary battery comprises a porous polymer electrolyte as an electrolyte.

14. A process for the preparation of a non-aqueous electrolyte secondary battery comprising metallic lithium on a negative electrode, which comprises a step of assembling a positive electrode comprising a positive active material into a non-aqueous electrolyte secondary battery, said positive active material containing at least one of lithium nickel oxide having a ratio of lithium atoms to oxygen atoms within the range of from greater than 0.5 to not greater than 1 and lithium manganese spinel having a ratio of lithium atoms to oxygen atoms within the range of from greater than 0.25 to not greater than 0.5, a step of inserting said positive electrode and a negative electrode into a battery case, and a step of forming metallic lithium directly on a current collector of said negative electrode by charging the non-aqueous electrolyte secondary battery.

* * * * *